United States Patent [19]
Borden et al.

[11] Patent Number: 5,870,629
[45] Date of Patent: Feb. 9, 1999

[54] SYSTEM FOR SERVICING PLURALITY OF QUEUES RESPONSIVE TO QUEUE SERVICE POLICY ON A SERVICE SEQUENCE ORDERED TO PROVIDE UNIFORM AND MINIMAL QUEUE INTERSERVICE TIMES

[75] Inventors: J. Martin Borden, Littleton; Nanying Yin, Newton, both of Mass.

[73] Assignee: Bay Networks, Inc., Santa Clara, Calif.

[21] Appl. No.: 621,130

[22] Filed: Mar. 21, 1996

[51] Int. Cl.[6] ........................................... G06F 13/14
[52] U.S. Cl. ..................... 395/864; 395/892; 370/412; 370/455
[58] Field of Search ..................... 370/412, 455; 354/244.3; 395/849, 856, 864, 859, 874

[56] References Cited

U.S. PATENT DOCUMENTS

| | | | |
|---|---|---|---|
| 5,166,930 | 11/1992 | Braff et al. | 370/94.1 |
| 5,231,633 | 7/1993 | Hluchyj et al. | 370/94.1 |
| 5,257,258 | 10/1993 | Birman et al. | 370/60 |
| 5,268,900 | 12/1993 | Hluchyj et al. | 370/94.1 |
| 5,506,898 | 4/1996 | Costantini et al. | 379/266 |
| 5,517,677 | 5/1996 | Moon | 455/161.1 |
| 5,553,061 | 9/1996 | Waggener, Jr. et al. | 370/17 |
| 5,581,544 | 12/1996 | Hamada et al. | 370/253 |
| 5,623,668 | 4/1997 | Nieuwenhuizen | 395/670 |
| 5,631,694 | 5/1997 | Aggarwal et al. | 348/7 |
| 5,694,548 | 12/1997 | Baugher et al. | 395/200.12 |

OTHER PUBLICATIONS

Lam, Store–and–Forward Buffer Requirements in a Packet Switching Network, IEEE Transactions on Communication, vol. Com–24, No. 4, pp.394–403, Apr. 1976.

Kamoun et al, Analysis of Shared Finite Storage in a Computer Network node Environment Under General Traffic Conditions, IEEE Transactions on Communications, vol. Com–28, No. 7, pp. 992–1003, Jul. 1980.

Hyman et al, Real–Time Scheduling with Quality of Service Constraints, IEEE Journal on Selected Areas of Communications, vol. 9, No. 7, pp. 1052–1063, Sep. 1991.

*Primary Examiner*—Thomas C. Lee
*Assistant Examiner*—Anderson I. Chen
*Attorney, Agent, or Firm*—Blakely, Sokoloff, Taylor & Zafman LLP

[57] ABSTRACT

A system for servicing a plurality of queues containing data cells for transmission over a communication medium. Each queue has an associated queue priority. A queue service sequence is generated in response to the queue priorities and represents a specific order for servicing the plurality of queues. A particular queue is selected for servicing in response to the queue service sequence. When a particular queue has been selected, a data cell is transmitted from the selected queue across the communication medium.

12 Claims, 5 Drawing Sheets

SYSTEM FOR SERVICING PLURALITY OF QUEUES RESPONSIVE TO QUEUE SERVICE POLICY ON A SERVICE SEQUENCE ORDERED TO PROVIDE UNIFORM AND MINIMAL QUEUE INTERSERVICE TIMES

BACKGROUND OF THE INVENTION

1. Field of the Invention

The present invention relates to queue servicing. More specifically, generating a queue service sequence to determine the particular order in which queues are serviced.

2. Background

Queues are used to temporarily store data awaiting transmission or processing by another device or system. Systems may be connected to receive data from multiple queues. Each queue may handle or represent a particular class or type of data traffic. For example, one queue might receive real-time audio or video signals having a high priority while other queues may receive data having a lower priority and not requiring immediate servicing.

Various systems have been developed to service multiple queues having different priorities. A known queue servicing procedure utilizing strict priority always services the highest priority queue first. If all data in the highest priority queue has been processed, then the next highest priority queue will be serviced. However, if the highest priority queue always contains data to be processed, then the lower priority queues may never be serviced. This may result in lower priority queues filling with data which is never processed, not processed in a timely manner, or discarded. Even the second highest priority queue will not be serviced if the highest priority queue always contains data cells awaiting processing. To avoid this problem, some round-robin queue servicing systems require that lower priority queues be serviced at regular intervals, regardless of the existence of data in the higher priority queues. This method ensures that all queues will be serviced, although the servicing may be relatively infrequent.

Another system for servicing queues assigns a weight to each queue. This weight represents the relative frequency with which the queue is serviced. For example, a high priority queue may be weighted such that it receives 70% of the servicing time available while lower priority queues receive the remaining 30% of the servicing time. Thus, the higher priority queues are assigned higher weights to provide greater servicing times for handling the important data.

Another queue servicing procedure may be referred to as "asynchronous time sharing" and is described in *Real Time Scheduling with OOS Constraints*, Jay Hyman et al, IEEE Journal on Selected Areas of Communications, vol. 9, Sep. 1991. This procedure assigns a particular period of time for processing each queue which is proportional to the weight of the queue. For example, a particular system receives data from three queues, labeled A, B, and C. Queue A has a weight of 7, queue B has a weight of 3 and queue C has a weight of 2. During a particular time period providing twelve queue servicing operations, the pattern of queue service might be: AAAAAAABBBCC. This procedure provides for servicing of the various queues in proportion to their weights, but does not consider problems created by jitter. Jitter is caused by non-uniform servicing of the queues. In the above example, queue A is serviced for seven consecutive time periods, but is not serviced again for the next five time periods. If queue A is transmitting real-time data such as audio or video data, then the transmitted sound or image may not be smooth because certain data cells are not handled in a timely manner; e.g., the five time periods when queues B and C are being serviced. The data from each queue is transmitted in bursts, with significant delays between the bursts. In the case of real-time data transmission, it is important to use a queue servicing procedure providing relatively constant and small queue interservice times. Therefore, this servicing procedure and the additional procedures discussed above do not reduce jitter in the data flowing from the queues.

SUMMARY OF THE INVENTION

The present invention provides a system for generating a queue service sequence to determine the particular order in which queues are serviced. The queue service sequence considers the number of queues to be serviced, queue priorities, and the weight assigned to each queue when constructing the service sequence. The sequence generated is cyclical and reduces jitter by providing a relatively uniform queue interservice time, especially with regard to the higher priority queues. This reduction in jitter is especially important when processing real-time data such as audio or video data signals.

An embodiment of the present invention provides a system for servicing a plurality of queues containing data cells for transmission across a communication medium. Each of the queues has an associated queue priority. A queue service sequence is generated in response to the priorities of the queues. The queue service sequence represents a specific order to be used when servicing the queues. A particular queue to be serviced is selected in response to the queue service sequence. A data cell is then transmitted from the selected queue across the communication medium.

Another feature of the present invention provides for transferring the queue service sequence to a service determiner. The service determiner controls the selection of the queues and the transmission of data cells from the selected queue.

The queue service sequence generated by the present invention includes a plurality of elements. Each element represents a particular queue to service. The number of elements required in a queue service sequence is determined by summing the weights of all queues to be serviced. The queue service sequence generated by the present invention provides for substantially uniform and minimum queue interservice times.

Another aspect of the present invention provides a service sequence generator for generating the queue service sequence. A service determiner is coupled to the service sequence generator and produces an output indicating a particular queue to service. A server is coupled to the service determiner and transmits a data cell from the selected queue across a communication medium.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the present invention. However, those skilled in the art will appreciate that the present invention may be practiced without these specific details. In other instances, well known methods, procedures, components, and circuits have not been described in detail so as not to obscure the present invention.

The present invention provides a system for generating a queue service sequence to determine the particular order in which queues are to be serviced. When constructing the queue service sequence, the present invention considers the number of queues to be serviced as well as the weight and priority assigned to each queue. The queue service sequence is cyclical and reduces jitter by providing relatively uniform queue interservice times, especially with respect to the higher priority queues. This reduction in jitter is particularly important when processing real-time data such as audio or video signals. Minimizing jitter is also important in situations where queues have stringent delay Quality of Service (QOS) requirements.

Figure 1:
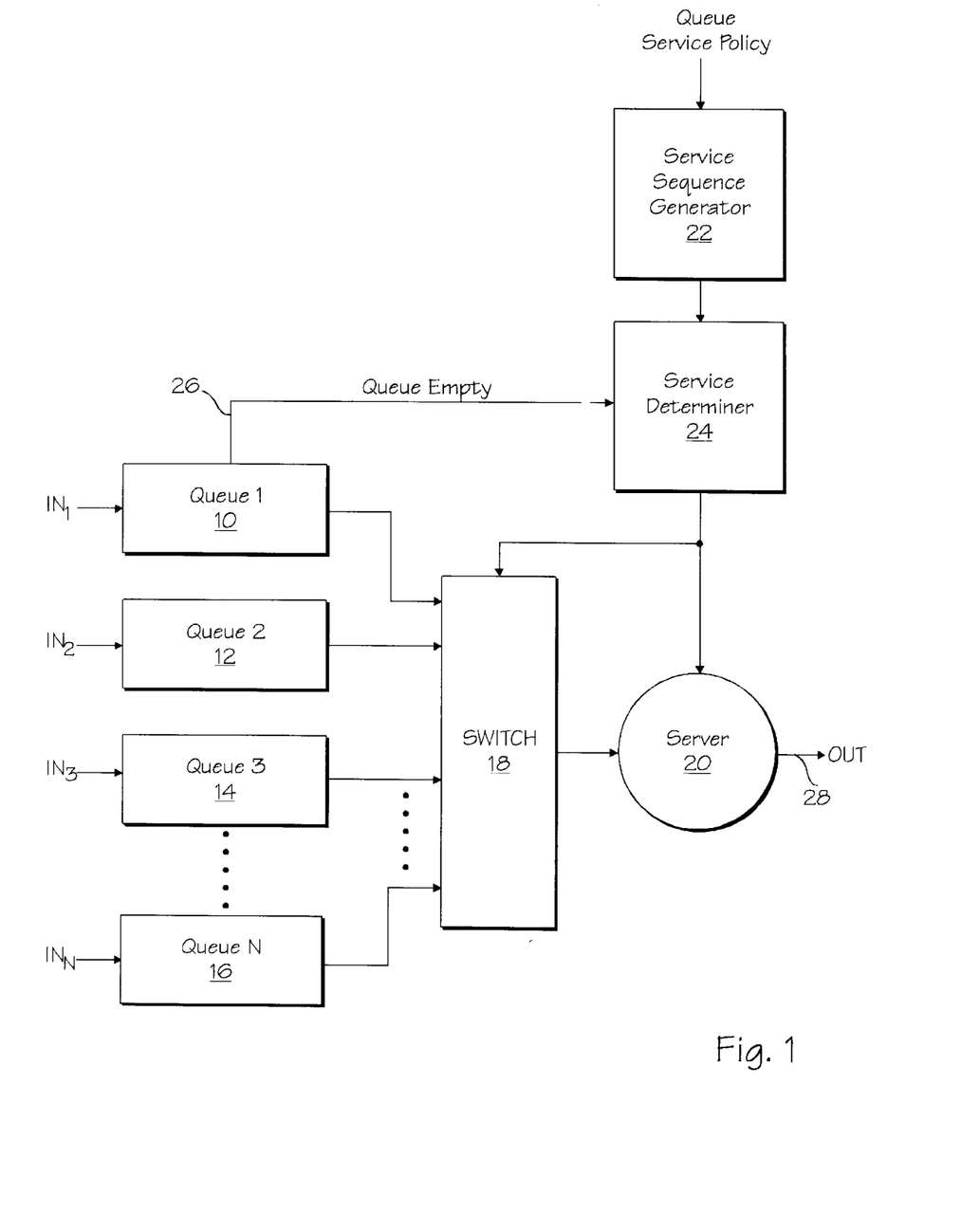
FIG. 1 is a block diagram of a system for servicing a plurality of queues.

FIG. 1 illustrates a block diagram of a system for servicing a plurality of queues according to the present invention. A plurality of queues 10, 12, 14, and 16 receive data on corresponding input lines ($IN_1$, $IN_2$, $IN_3$, and $IN_N$). Queues 10–16 may receive and store data in various formats. Throughout this specification, the term "data cells" shall be used to indicate a particular group or packet of data in any format. Thus, the present invention is not limited to any particular data format or transmission format. The queues may receive various types of data from a variety of different sources. Each queue may represent a distinct service or class of services. The present invention may be used for servicing various types of queues containing various types of data. Any number of queues may be serviced according to the structures and methods provided by the present invention.

Each queue 10–16 has an output coupled to an input of a switch 18 capable of receiving data from the queues. Switch 18 may be a multiplexer or any other switching device capable of switching between a plurality of different input data queues. A server 20 receives the output from switch 18 and sends data to a transmission line 28. The system illustrated in FIG. 1 may be used in a router, a switch, or any other device capable of transmitting data across a transmission line.

Transmission line 28 may be a trunk line, a hardwired connection to another system, a radio frequency link, or any other communication medium. If the queue servicing system and transmission line 28 are contained completely within a computer system, then the transmission line may be a lead or other electrical connection within the computer system itself. Thus, transmission line 28 provides a path for transmitting data from the selected queue to the appropriate destination.

A service sequence generator 22 is illustrated in FIG. 1 and receives various queue service policies. The queue service policies may include the number of queues to be serviced, the weight and priority of each queue, the frequency with which each queue must be serviced, and the minimum required bandwidth for each queue. This service policy may be provided by a user or administrator of the system. Alternatively, the system itself may determine and modify the queue service policy based on traffic flow and various other factors. Based on the service policy received, service sequence generator 22 generates a queue service sequence which determines the order in which queues 10–16 are to be serviced. Details regarding construction of the queue service sequence are provided below.

A service determiner 24 receives the queue service sequence from sequence generator 22 and outputs appropriate instructions to server 20 and switch 18. The output instructions provided by service determiner 24 identify the particular queue to service at that time. Switch 18 selects the proper queue based on the instruction from service determiner 24 and provides the data from the selected queue to server 20. Server 20 then transmits the selected queue data across transmission line 28. A queue empty signal line 26 is connected between each of queues 10–16 and service determiner 24. For clarity purposes, only a single queue empty signal line is illustrated in FIG. 1. The queue empty signal indicates that the particular queue contains no data cells to be transmitted. Accordingly, service determiner 24 can skip to the next queue in the sequence, increasing the overall speed at which the queues are serviced.

FIG. 1 illustrates a particular system for servicing a plurality of queues in accordance with the present invention. Although sequence generator 22 and service determiner 24 are shown and described as two separate devices. However, those skilled in the art will appreciate that the two devices may be combined together in a single device. Furthermore, the functions of the service sequence generator and the service determiner may be implemented in hardware or software.

Figure 2A:
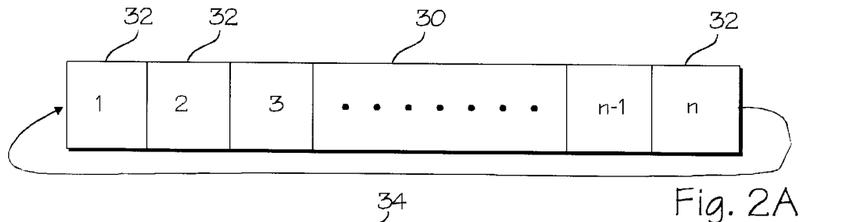
FIG. 2A illustrates a general queue service sequence generated and utilized by the present invention.

Referring to FIG. 2A, a cyclical queue service sequence is illustrated. This sequence is capable of being generated and utilized by the present invention. A queue service sequence 30 contains a plurality of elements 32. Each element contains a "label" or information indicating a particular queue to service. The particular order of the labels assigned to elements 32 determines the order or sequence in which the queues will be serviced. Queue service sequence 30 is cyclical; i.e., when the last element in the sequence has been processed, the sequence returns to the first element in the sequence. In the queue service sequence of FIG. 2A, after element "n" has been processed, the sequence continues by returning to element "1" and servicing the particular queue indicated by that element. The number of elements 32 contained in a particular queue service sequence 30 varies with the number of queues to be serviced, the queue weights, and other factors discussed in greater detail below.

FIGS. 2B–2E illustrate a specific queue service sequence 34 having sixteen elements 36 (numbered 1–16). These figures illustrate the procedure used to create a queue service sequence 34 by assigning particular queues to each element 36 in FIG. 2B. In this example, it is important to minimize jitter, especially with respect to the highest priority queue and to guarantee or reserve a specific minimum bandwidth for each queue. The minimum bandwidth guaranteed to a particular queue ensures that the queue will be serviced a specific number of times during a particular period. For example, a particular queue may be guaranteed a bandwidth such that the queue is serviced at least ten times during a period in which 100 queue service operations occur. Thus, the queue is guaranteed to receive at least 10% of the available bandwidth.

Figure 2B:
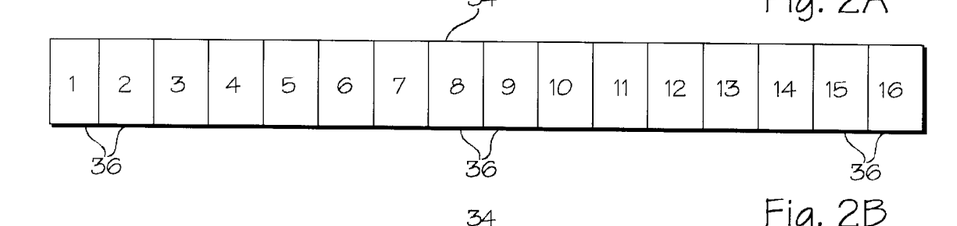
FIGS. 2B–2E illustrate the creation of a particular queue service sequence.
Figure 2C:
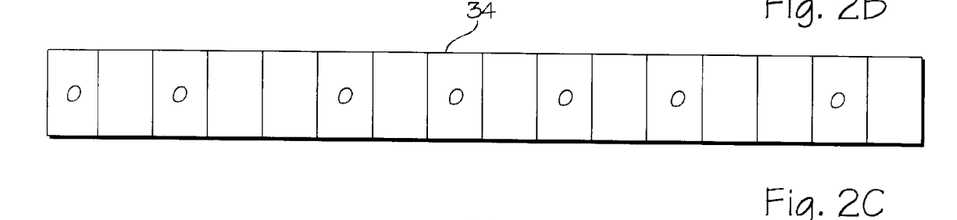

Referring to FIG. 2B, elements 36 do not initially contain any information regarding a queue to be serviced. To illustrate an example of generating a queue service sequence, a queue labeled "Queue 0" has a high priority and must be serviced seven times during each cycle through queue service sequence 34. As shown in FIG. 2C, a label indicating that Queue 0 must be serviced is placed in elements numbered 1, 3, 6, 8, 10, 12, and 15. Thus, Queue 0 will be serviced seven times during each cycle (if there is data in the queue), and at somewhat regular intervals. FIG. 2C illustrates relatively uniform queue interservice times, rather than providing "bursts" of service followed by long periods without service. Additionally, Queue 0 is guaranteed a minimum bandwidth of seven queue service operations during each cycle through sequence 34. The specific method and calculations used to determine the particular elements assigned to service Queue 0 are described in greater detail with respect to FIG. 4, below.

Figure 2D:
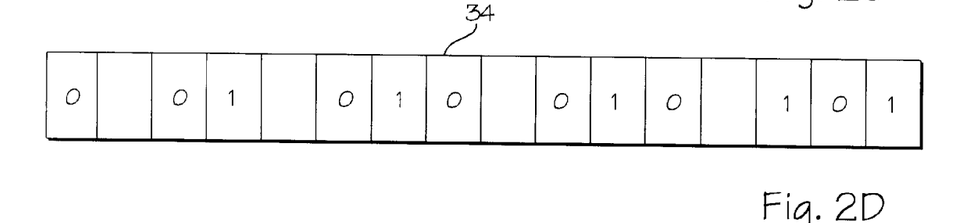

Referring to FIG. 2D, a queue labeled "Queue 1" has the next highest priority after Queue 0, and must be serviced five times during each cycle through queue service sequence 34. As illustrated, a label indicating that Queue 1 must be serviced is placed in elements numbered 4, 7, 11, 14, and 16. As with Queue 0, the Queue 1 labels are spaced apart at somewhat regular intervals. For the reasons discussed above, this spacing reduces jitter in the data transmitted from Queue 1 and ensures a particular bandwidth for the Queue 1 data; i.e., five of the sixteen elements are assigned to Queue 1.

Figure 2E:
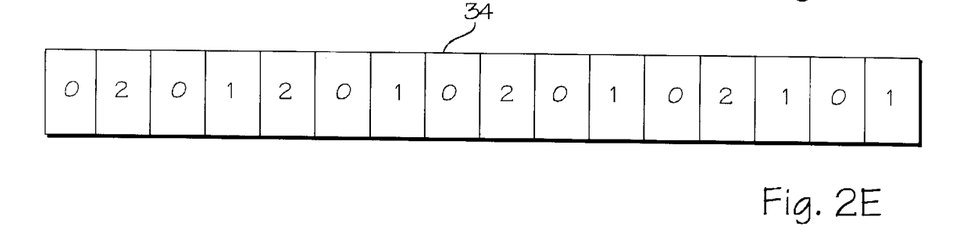

Referring to FIG. 2E, Queue 2 labels are placed in the four remaining elements numbered 2, 5, 9, and 13. As illustrated, the Queue 2 labels are spaced apart from one another, thereby reducing jitter and ensuring a particular bandwidth for the data in Queue 2. Thus, FIG. 2E represents a complete queue service sequence which is executed repeatedly to service the three queues. During each cycle through sequence 34, each queue is guaranteed a particular number of queue service operations at intervals defined by the sequence. Jitter is minimized due to the relatively uniform queue interservice times.

Figure 3:
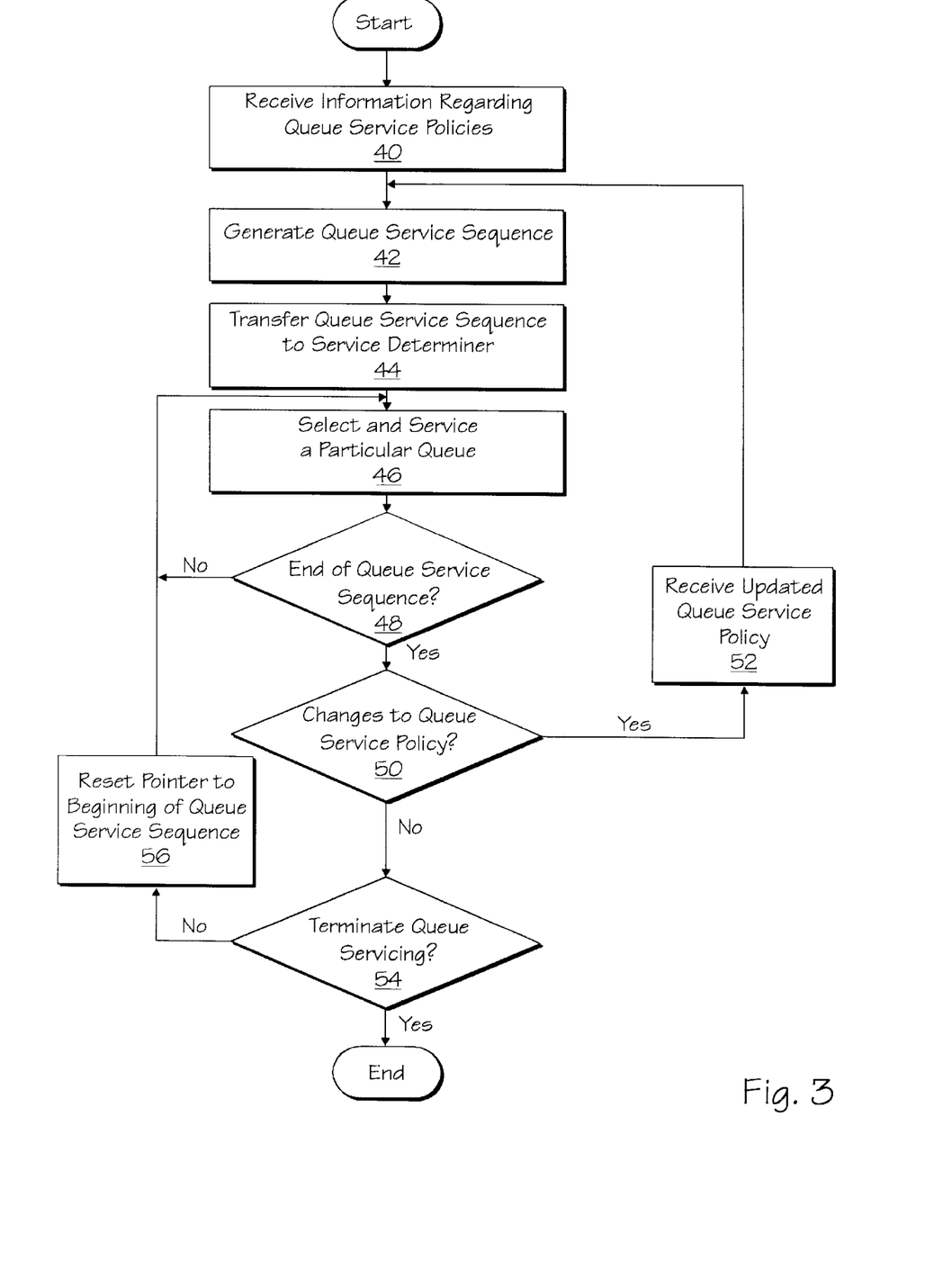
FIG. 3 is a flow diagram illustrating the operation of the queue servicing system.

Referring to FIG. 3, a flow diagram illustrates the overall operation of the present invention. At step 40, information is received regarding queue service policies. The information received includes the number of queues to be serviced, the weight assigned to each queue, and the minimum bandwidth required by each queue. Additional information may be received regarding the quality of service (QOS) to be provided to each queue. Quality of service refers to the degree of service received by data in the system in terms of delay time and loss probability. Queues requiring a high quality of service are typically assigned a high priority to ensure frequent servicing at regular intervals.

At step 42, a queue service sequence is generated. An example of this procedure is described below with respect to FIG. 4. After the queue service sequence is generated, the routine continues to step 44 where the queue service sequence is transferred, or copied, to the service determiner. As discussed above, the service determiner generates appropriate signals to select the proper queue for servicing. Step 46 selects and services a particular queue based on the queue service sequence. The particular queue to service is indicated by the label in the element identified by a sequence pointer. Initially, the sequence pointer identifies the first element of the queue service sequence, indicating that the queue identified by the first element is to be serviced.

After the selected queue has been serviced, the sequence pointer is advanced to the next element in the service. If the particular queue to be serviced is empty, then the routine continues to step 48 without servicing any queue. At step 48, a determination is made regarding whether the pointer has reached the end of the queue service sequence. If the end of the sequence has not been reached, the routine branches to step 46 to select and service the next queue in the sequence. If the end of the sequence has been reached, the routine branches to step 50 to determine whether any changes have been made to the queue service policy. These changes may include the addition of a new queue, deletion of an existing queue, or changes to queue weighting, queue priority, or queue bandwidth requirements. If changes have been made to the queue service policy then the routine branches to step 52 to receive the updated queue policy, and returns to step 42 to generate a new queue service sequence.

If no changes have been made to the queue service policy then the routine continues to step 54 to determine whether queue servicing should be terminated. If queue servicing is not to be terminated, then step 56 resets the pointer to the beginning of the queue service sequence (because step 48 detected the end of the sequence). After resetting the pointer, the routine continues to step 46 to select and service the first queue in the sequence.

Figure 4:
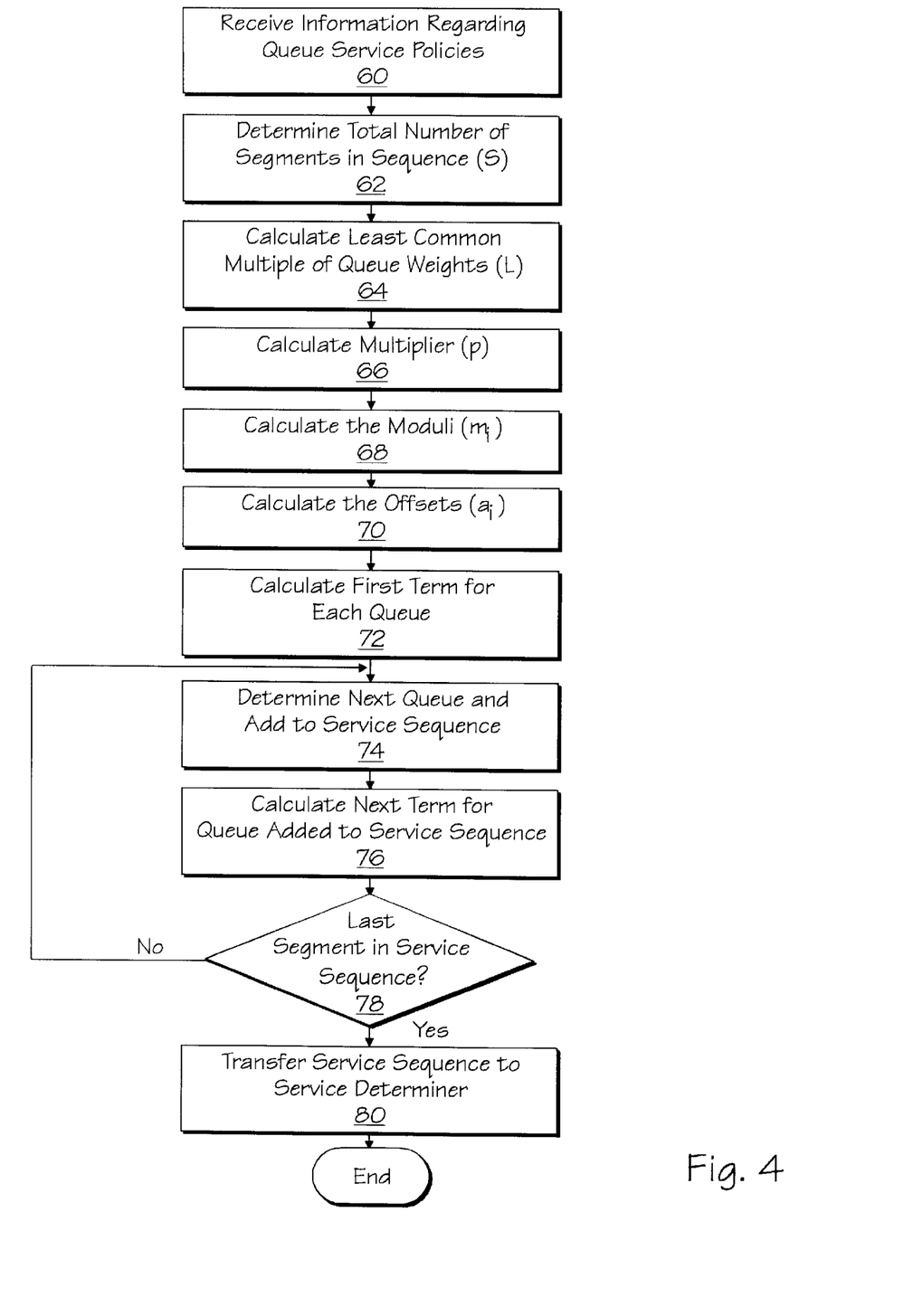
FIG. 4 is a flow diagram showing the procedure used to create a queue service sequence.

Referring to FIG. 4, a flow diagram illustrates a procedure for creating a queue service sequence having minimal jitter and providing a guaranteed bandwidth for each queue. At step 60, information is received regarding the queue service policies. As discussed above, this information includes the number of queues to be serviced, the weight assigned to each queue, and the minimum bandwidth required by each queue. Information may also be received regarding the quality of service (QOS) to be provided for each queue.

Figures 5A, 5B, 5C:
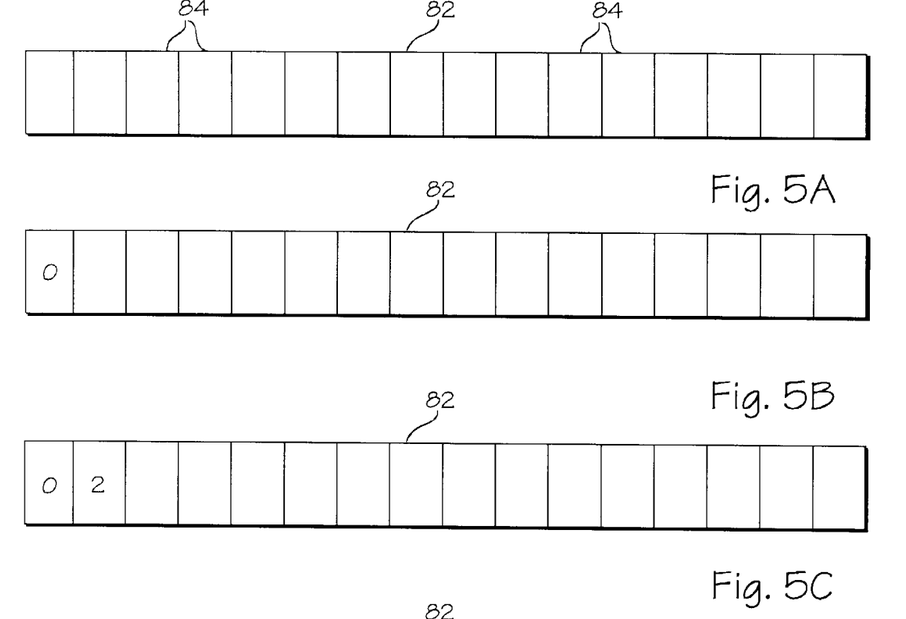
FIGS. 5A–5E illustrate the generation of a queue service sequence utilizing the procedure FIG. 4.

FIGS. 5A–5E illustrate the generation of a queue service sequence in accordance with the present invention. Specifically, FIG. 5A illustrates a queue service sequence 82 containing sixteen elements 84. FIGS. 5A–5E are similar to FIGS. 2B–2E, but illustrate the actual process used to generate the queue service sequence.

The example shown in FIGS. 5A–5E will be used to illustrate the calculations and methods shown in FIG. 4. In FIGS. 5A–5E, three different queues must be serviced: Queue 0, Queue 1, and Queue 2. Queue 0 has a high priority, Queue 1 has a medium priority, and Queue 2 has a low priority. Queue 0 has a weight of seven ($w_0=7$), Queue 1 has a weight of five ($w_1=5$), and Queue 2 has a weight of four ($w_2=4$). Thus, during any particular cycle through queue service sequence 82, Queue 0 must be serviced seven times, Queue 1 must be serviced five times, and Queue 2 must be serviced four times.

At step 62 of FIG. 4, the routine determines the total number of elements which are required for the queue service sequence being generated. The total number of elements required is represented by S and is calculated by adding the weights of all queues to be serviced. Thus, $S=w_0+w_1+w_2+\ldots+w_{n-1}$. In the example of FIGS. 5A–5E, $S=7+5+4=16$. Therefore, the queue service sequence requires sixteen elements 84, as shown in FIG. 5A. The minimum bandwidth required by each queue is determined by the particular queue weight in proportion to the total weight. In the above example, Queue 0 receives 7/16 (or 44%) of the bandwidth, Queue 1 receives 5/16 (or 31%) of the bandwidth, and Queue 2 receives 4/16 (or 25%) of the bandwidth.

After the number of required elements has been determined, additional calculations are performed to establish a particular order for servicing the queues. At step 64, the least common multiple of the queue weights is determined and represented by L. The least common multiple may be calculated using Euclid's Algorithm for the greatest common divisor. The least common multiple of A and B is equal to the product A·B divided by the greatest common divisor. Additional details regarding Euclid's Algorithm may be found in *The Design and Analysis of Computer Algorithms* A. V. Aho, J. E. Hopcroft, J. D. Ullman, Addison-Wesley Publishing Co., Reading, Mass., 1974.

In the above example, the least common multiple of the weights (7,5, and 4) is 140 (L=140).

At step 66, a multiplier is calculated and represented by p. Multiplier p is a small number such that p>2n−3, where n is the number of queues to be serviced. In the above example, n=3 and multiplier p>2·3−3 (or p>3). For this example, multiplier p is selected as five (p=5). Although p=5 is used in this example, any value of p satisfying the condition p>2n−3 may be used in generating the queue service sequence.

Step 68 of FIG. 4 determines the modulus ($m_i$) for each queue weight ($w_i$). The moduli which are defined as $m_i = p \cdot (L/w_i)$. Since L is a multiple of $w_i$, and p is an integer, $m_i$ is also an integer. Using the above example, L=140, p=5, and w={7,5,4}. Thus, $m_1$=100, $m_2$=140, and $m_3$=175.

At step 70, an offset $a_i$ is calculated for each queue weight ($w_i$). The calculation used to determine the value of offset $a_i$ varies depending on whether i is even or odd. If i is even, then $a_i$=i. If i is odd, then $a_i$=$m_i$−i. In the above example, $a_0$=0, $a_1$=139, and $a_2$=2.

The method described above for determining offset values $a_i$ is provided as an example. However, those skilled in the art will appreciate that other methods may be used to determine offset values. It is important that offsets be selected such that the terms for each of the queues are out of phase; i.e., each term has a unique value not shared by any other term.

The routine continues at step 72 where a first selection term is calculated for each queue. The selection terms are used to select the appropriate queue to assign to each element of the queue service sequence. The selection terms are calculated according to the following formula: terms for queue $i = a_i + k \cdot m_i$, where k=0, 1, . . . , $w_i$−1. Therefore, the terms for each queue in the above example are as follows:

| Queue 0 (0 + 100 · k): | 0 | 100 | 200 | 300 | 400 | 500 | 600 |
|---|---|---|---|---|---|---|---|
| Queue 1 (139 + 140 · k): | 139 | 279 | 419 | 559 | 699 | | |
| Queue 2 (2 + 175 · k): | 2 | 177 | 352 | 527 | | | |

Thus, at step 72 the first term for each queue is calculated by setting k=0, resulting in terms of 0, 139, and 2 for Queue 0, Queue 1, and Queue 2, respectively. The current set of terms is represented in the following manner: term ={0,139,2}. At this point, the queue service sequence contains sixteen "empty" elements; i.e., queue labels have not yet been assigned to any elements. This situation is illustrated in FIG. 5A.

At step 74 of FIG. 4, the routine determines which queue is to be assigned to the first element in the queue service sequence. This determination is made by selecting the queue having the lowest current term value. In the above example where term ={0,139,2}, Queue 0 has the lowest term value (zero). Thus, Queue 0 is selected as the first queue to service in queue service sequence 82. Accordingly, a label for Queue 0 is assigned to the first element 84 of the sequence, as illustrated in FIG. 5B.

Since the first term for Queue 0 has been selected, the next term value for Queue 0 is calculated at step 76 and replaces the first term value. After the next term (100) is calculated, term ={100,139,2}. At step 78, if the last element of the queue service sequence has been assigned a queue label, then the sequence is complete and is transferred to the service determiner at step 80.

Figure 5D:
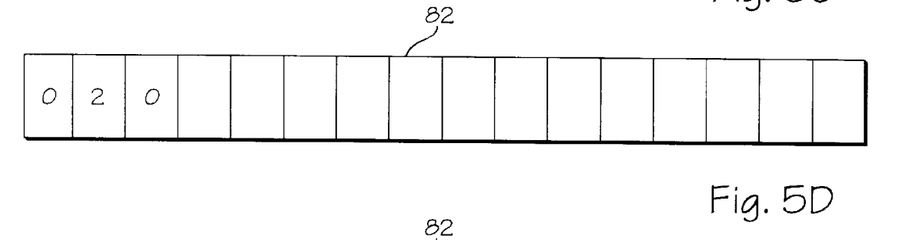

If one or more elements of the queue service sequence have not been assigned a queue label, then the routine branches to step 74 to determine the next queue to add to the sequence. As discussed above, if term ={100,139,2}, then Queue 2 has the smallest term value (2). Accordingly, Queue 2 is added to the next element of the queue service sequence, as shown in FIG. 5C. Continuing again to step 76, the next term value is calculated for Queue 2 (177), and term ={100,139,177}. When the routine again returns to step 174, Queue 0 has the smallest term value (100) and is added to the queue service sequence as illustrated in FIG. 5D.

Figure 5E:
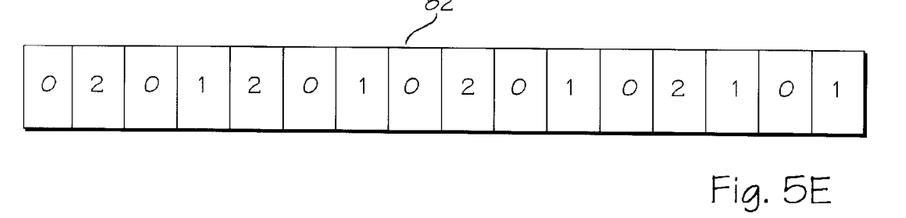

The above procedure continues until all elements of the queue service sequence are assigned a particular queue label, as shown in FIG. 5E. After the queue service sequence is complete, the sequence is transferred to the service determiner at step 80. The overall operation of queue servicing continues as described above with respect to FIG. 3.

Note, when the queue service sequence is nearly full, accurate terms may not be available for particular queues if all assignments have been made for that queue. For example, when the last three elements of the queue service sequence illustrated in FIG. 5E are being filled, an accurate term value does not exist for Queue 2 because all assignments for Queue 2 have already been made. Therefore, it is important to avoid assigning Queue 2 to any of the remaining elements. This may be accomplished by using a large term value for Queue 2, such that the term will not be selected. The term value must be greater than the largest accurate term value. In the above example, the largest accurate term value is 699 (Queue 1). Therefore, any term value of 700 or higher will never be selected because all elements will be filled before the term is selected. For example, when only the last element of the sequence in FIG. 5E remains to be filled, term ={9999, 699, 9999}. Since Queue 0 and Queue 2 have been completely assigned, their term values are arbitrarily large (9999), ensuring that the term value for Queue 1 is properly selected for the last element. At this point, the queue service sequence is complete and the values of the remaining terms are irrelevant.

The actual queue service sequence is generated in the manner illustrated in FIGS. 5A–5E. FIGS. 2B–2E are provided for explanation purposes and do not represent the actual order in which the queue labels are assigned to the elements of the queue service sequence.

As illustrated in FIG. 5E, the queue service sequence provides queue interservice times which are relatively uniform, especially with respect to the highest priority queue, Queue 0. The interval between any successive pair of elements servicing Queue 0 is either one or two elements. This provides a relatively smooth flow of data from Queue 0 across the transmission medium. Additionally, Queue 0 has a guaranteed minimum bandwidth provided by the queue service sequence. Similarly, the sequence provides relatively smooth data flow for Queue 1 and Queue 2 and guarantees a minimum bandwidth.

Specific examples are provided above for calculating the least common multiple L, the multiplier p, the offset values $a_i$, and the moduli $m_i$. Those skilled in the art will appreciate that other formulas and calculation methods may be used to determine values for L, p, $a_i$, and $m_i$.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for servicing a plurality of queues containing data cells for transmission across a communication medium, each of said queues having an associated queue service policy, said method comprising the steps of:

generating a queue service sequence responsive to a queue service policy, the queue service policy based on the number of queues to be serviced, the weight and priority of each queue, the frequency with which each queue must be serviced, and the minimum required bandwidth for each queue, wherein said queue service sequence represents a specific order for servicing said plurality of queues and wherein said queue service sequence is ordered to provide substantially uniform and minimal queue interservice times;

selecting a particular queue for servicing in response to said queue service sequence; and transmitting a data cell from the particular queue being serviced across said communication medium.

2. The method of claim 1 further including the step of transferring said queue service sequence to a service determiner for selecting the proper queue for servicing.

3. The method of claim 1 wherein said queue service sequence includes a plurality of elements, each element representing a particular queue to service.

4. The method of claim 3 wherein each queue to be serviced has an associated weight, and wherein the number of elements in said queue service sequence is determined by summing said queue weights.

5. The method of claim 1 wherein said queue service sequence is a cyclical sequence.

6. A method for generating a queue service sequence for servicing a plurality of queues wherein said queue service sequence contains a plurality of elements, said method comprising the steps of:

determining a queue service policy associated with each of said queues, the queue service policy based on the number of queues to be serviced, the weight and priority of each queue, the frequency with which each queue must be serviced, and the minimum required bandwidth for each queues, wherein said queue service sequence is ordered to provide substantially uniform and minimal queue interservice times;

calculating a particular number of elements required for said queue service sequence, each element representing a particular queue to service;

calculating selection terms for each queue to be serviced, said selection terms identifying the servicing order of said queues; and assigning particular queues to each element of said queue service sequence in response to said selection terms.

7. The method of claim 6 wherein said step of calculating a particular number of elements includes summing said weights associated with each queue.

8. The method of claim 6 wherein said selection terms are calculated by determining a modulus and an offset for each queue to be serviced.

9. An apparatus for servicing a plurality of queues, each queue receiving data cells for transmission across a communication medium, each of said queues having an associated queue service policy, said apparatus comprising:

a switch coupled to receive data cells from each of said queues and select a particular data cell for transmission across said communication medium;

a service sequence generator coupled to receive a queue service policy, the queue service policy based on the number of queues to be serviced, the weight and priority of each queue, the frequency with which each queue must be serviced, and the minimum required bandwidth for each queue, wherein said service sequence generator provides an output representing a specific order for servicing said plurality of queues in response to said queue service policy, wherein said specific order for sequencing is ordered to provide substantially uniform and minimal queue interservice times;

a service determiner coupled to said service sequence generator and generating an output indicating a particular queue to service; and a server coupled to said service determiner and said communication medium, said server coupled to receive said selected data cell from said switch and transmit said data cells across said communication medium.

10. The apparatus of claim 9 wherein said switch receives a control signal from said service determiner and selects one of said plurality of queues in response to said control signal.

11. The apparatus of claim 9 wherein said service determiner receives a queue status signal from said plurality of queues indicating whether each queue contains data cells for transmission across said communication medium.

12. The apparatus of claim 9 wherein said service determiner receives a cyclical queue service sequence generated by said service sequence generator.

* * * * *